United States Patent
Gu

(10) Patent No.: US 11,599,122 B2
(45) Date of Patent: Mar. 7, 2023

(54) VEHICLE CONTROL METHOD AND DEVICE

(71) Applicant: BEIJING BAIDU NETCOM SCIENCE AND TECHNOLOGY CO., LTD., Beijing (CN)

(72) Inventor: Jinyang Gu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/116,973

(22) Filed: Dec. 9, 2020

(65) Prior Publication Data
US 2021/0089049 A1 Mar. 25, 2021

Related U.S. Application Data

(63) Continuation of application No. PCT/CN2019/112779, filed on Oct. 23, 2019.

(30) Foreign Application Priority Data

Jan. 16, 2019 (CN) .......................... 201910041443.8

(51) Int. Cl.
*G05D 1/02* (2020.01)
*B60W 30/06* (2006.01)

(52) U.S. Cl.
CPC .......... *G05D 1/0276* (2013.01); *B60W 30/06* (2013.01); *G05D 1/0214* (2013.01); *B60W 2540/229* (2020.02); *B60W 2556/45* (2020.02)

(58) Field of Classification Search
CPC ............... G05D 1/0276; G05D 1/0214; G05D 2201/0213; G05D 1/0027; B60W 30/06;
(Continued)

(56) References Cited

U.S. PATENT DOCUMENTS

2012/0010961 A1 5/2012 Anderson et al.
2017/0286575 A1 10/2017 Emond et al.
(Continued)

FOREIGN PATENT DOCUMENTS

CN 102862568 A 1/2013
CN 107589745 A 1/2018
(Continued)

OTHER PUBLICATIONS

International Search Report dated Jan. 22, 2020 of PCT Application No. PCT/CN2019/112779 in 4 pages.
(Continued)

*Primary Examiner* — Rodney A Butler
(74) *Attorney, Agent, or Firm* — Knobbe, Martens, Olson & Bear, LLP

(57) ABSTRACT

A vehicle control method and device are disclosed. An embodiment of the method includes: receiving an assistance driving instruction associated with a vehicle; and sending an assistance control instruction to the vehicle, to cause the vehicle to execute the assistance control instruction to control the vehicle, the assistance control instruction being generated through a simulation driving operation performed by an assistance driving user based on travelling environment information of the vehicle presented to the assistance driving user.

14 Claims, 4 Drawing Sheets

(58) Field of Classification Search
CPC ....... B60W 2540/229; B60W 2556/45; B60W 60/0051; B60W 2050/0074; B60W 2540/215; B60W 2756/10; B62D 15/0285
See application file for complete search history.

(56) References Cited

U.S. PATENT DOCUMENTS

| | | |
|---|---|---|
| 2017/0308082 A1 | 10/2017 | Ullrich et al. |
| 2018/0039274 A1 | 2/2018 | Saibel |
| 2018/0105165 A1 | 4/2018 | Alarcon et al. |
| 2018/0364703 A1 | 12/2018 | Liu et al. |
| 2021/0134154 A1* | 5/2021 | Wang ............... G08G 1/096725 |

FOREIGN PATENT DOCUMENTS

| | | | |
|---|---|---|---|
| CN | 107672597 A | 2/2018 | |
| CN | 108428357 A | 8/2018 | |
| CN | 108944916 A | 12/2018 | |
| CN | 108944917 A | 12/2018 | |
| CN | 109131162 A | 1/2019 | |
| CN | 109753069 A | 5/2019 | |
| CN | 109808703 A | 5/2019 | |
| DE | 10309934 A1 * | 9/2004 | ............. G09B 9/042 |
| WO | WO 2016/038931 | 3/2016 | |
| WO | WO 2018/087828 | 5/2018 | |

OTHER PUBLICATIONS

Extended European Search Report of Dec. 17, 2021 for European Patent Application No. 19910878.8. 8 pages.

* cited by examiner

VEHICLE CONTROL METHOD AND DEVICE

CROSS-REFERENCE TO RELATED APPLICATION

This patent application is a continuation of International Application No. PCT/CN2019/112779, filed on Oct. 23, 2019, which claims the priority from Chinese Application No. 201910041443.8, filed on Jan. 16, 2019, entitled "Vehicle Control Method and Device," the entire disclosures of which are hereby incorporated by reference.

TECHNICAL FIELD

The present disclosure relates to the field of vehicle, specifically to the field of vehicle control, and more specifically to a method and apparatus for controlling a vehicle.

BACKGROUND

At present, as computer technologies such as image recognition are widely applied to a vehicle, the environment perception capability of the vehicle is enhanced. However, the environment perception capability of the vehicle is stilled limited. For example, in a situation where the vehicle travels to an area having a complex travelling environment, travelling relying on the environment perception capability of the vehicle itself may lead to such as a situation that the vehicle cannot pass through the area having the complex travelling environment, a situation that an accident occurs, and etc.

SUMMARY

Embodiments of the present disclosure provide a method and apparatus for controlling a vehicle.

in a first aspect, some embodiments of the present disclosure provide a method for controlling a vehicle, the method incudes: receiving an assistance driving instruction associated with a vehicle; and sending an assistance control instruction to the vehicle, to cause the vehicle to execute the assistance control instruction to control the vehicle, the assistance control instruction being generated through a simulation driving operation performed by an assistance driving user based on travelling environment information of the vehicle presented to the assistance driving user.

In a second aspect, some embodiments of the present disclosure provide an apparatus for controlling a vehicle, the apparatus includes: an instruction receiving unit, configured to receive an assistance driving instruction associated with a vehicle; and an assistance driving unit, configured to send an assistance control instruction to the vehicle, to cause the vehicle to execute the assistance control instruction to control the vehicle, the assistance control instruction being generated through a simulation driving operation performed by an assistance driving user based on travelling environment information of the vehicle presented to the assistance driving user.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
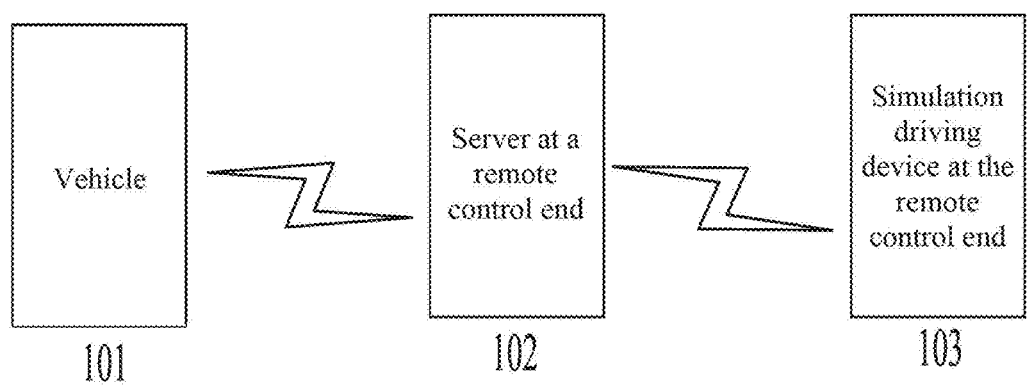
FIG. 1 illustrates an example system architecture in which a method for controlling a vehicle according to embodiments of the present disclosure may be applied.

FIG. 1 illustrates an example system architecture in which a method for controlling a vehicle according to embodiments of the present disclosure may be applied.

As shown in FIG. 1, the system architecture may include a vehicle 101, a server 102 at a remote control end, and a simulation driving device 103 at the remote control end. The vehicle 101 may be an autonomous driving vehicle having an autonomous driving capability. A person assisting in driving the vehicle 101 through a simulation driving operation at the remote control end may be referred to as an assistance driving user.

The simulation driving device 103 at the remote control end has a simulation driving part, a display, etc. The simulation driving part includes a steering wheel, a pedal, etc.

The vehicle 101 has a sensor combination that may include, but not limited to, a camera, a laser radar and a millimeter wave radar. The vehicle 101 may send travelling environment information, such as a collected road condition image and an attribute of a detected obstacle, to the server 102 at the remote control end. The server 102 at the remote control end may send the travelling environment information to the simulation driving device 103 at the remote control end. On the display of the simulation driving device 103, the road condition image, the attribute of the detected obstacle, etc. are presented to the assistance driving user.

The assistance driving user at the remote control end performs a simulation driving operation on the simulation driving part based on the travelling environment information presented to the assistance driving user, to generate an assistance control instruction corresponding to the simulation driving operation. The generated assistance control instruction may be sent to the vehicle 101 via the server 102 at the remote control end. The control system of the vehicle 101 executes the assistance control instruction to control the vehicle 101.

Figure 2:
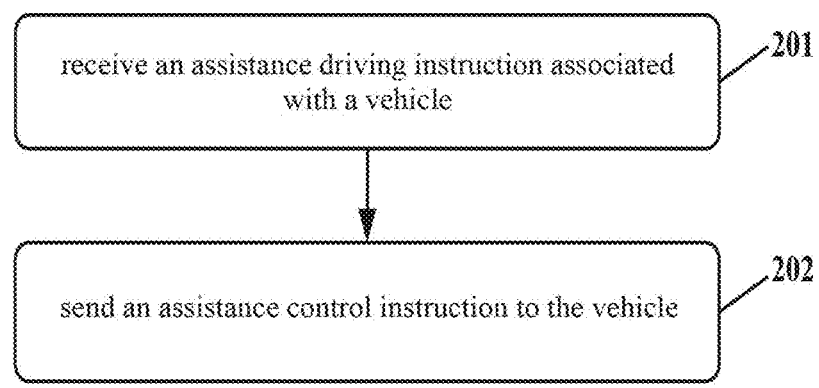
FIG. 2 is a flowchart of a method for controlling a vehicle according to an embodiment of the present disclosure.

Referring to FIG. 2, FIG. 2 illustrates a flow of a method for controlling a vehicle according to an embodiment of the present disclosure. The method includes the following steps:

Step 201, receiving an assistance driving instruction associated with a vehicle.

In this embodiment, the assistance driving instruction associated with the vehicle may be received by a simulation driving device at a remote control end. The assistance driving instruction may be generated in a situation where the vehicle needs assistance in driving.

In this embodiment, the assistance driving instruction associated with the vehicle may refer to an assistance driving instruction inputted by an assistance driving user at the remote control end. When determining that the vehicle needs assistance in driving based on the travelling environment information of the vehicle presented to the assistance driving user at the remote control end, the assistance driving user at the remote control end may input the assistance driving instruction. The assistance driving instruction input by the assistance driving user at the remote control end may be received by the simulation driving device at the remote control end.

For example, the vehicle sends the travelling environment information generated for the vehicle to the server at the remote control end in real time, and the server at the remote control end sends the travelling environment information to the simulation driving device at the remote control end. The travelling environment information of the vehicle may include, but not limited to, a collected travelling environment image and an attribute of an obstacle detected by the vehicle. The collected environment image includes another vehicle, a pedestrian, a traffic sign, etc. in the vicinity of the vehicle. The travelling environment information is presented to the assistance driving user at the remote control end through the simulation driving device at the remote control end, and thus, the assistance driving user at the remote control end may learn the environment where the vehicle is currently located. If the assistance driving user at the remote control end finds that the vehicle is in a complex environment and needs assistance in driving based on the travelling environment information presented to the assistance driving user at the remote control end, the assistance driving user at the remote control end may input the assistance driving instruction. For example, when a vehicle is in a complex travelling environment, the vehicle may stop travelling or cannot pass through an area where roads are complicated for a long time due to being unable to make a driving decision. At this time, the assistance driving user at the remote control end may determine that the situation where the vehicle stops travelling or cannot pass through the area where the roads are complicated for a long time occurs to the vehicle, based on the travelling environment information of the vehicle presented to the assistance driving user. The assistance driving user at the remote control end may input the assistance driving instruction, and the assistance driving instruction input by the assistance driving user at the remote control end may be received by the simulation driving device at the remote control end.

In this embodiment, the assistance driving instruction associated with the vehicle may also refer to an assistance driving instruction generated in and sent by the vehicle. For example, when the vehicle is in the complex travelling environment, the driver of the vehicle may click a button for requesting assistance driving on an interface of a terminal application, the terminal application is for an interaction between the terminal and with an autonomous driving vehicle, to request the assistance driving user to perform a simulation driving operation to assist the driver of the vehicle to stop. After the driver of the vehicle clicks the button, the assistance driving instruction is generated. The assistance driving instruction is sent by the vehicle to the server at the remote control end, and then the assistance driving instruction sent from the vehicle is sent to the simulation driving device at the remote control end by the server at the remote control end.

Step 202, sending an assistance control instruction to the vehicle.

In this embodiment, the assistance control instruction is generated through a simulation driving operation performed by the assistance driving user based on the travelling environment information of the vehicle presented to the assistance driving user. The control instruction generated based on a simulation driving operation and may be executed by the vehicle may be referred to as the assistance control instruction. After receiving the assistance driving instruction associated with the vehicle, the simulation driving device at the remote control end may set a simulation driving part, such as a steering wheel and a pedal, to a working state. The assistance driving user at the remote control end may perform a simulation driving operation by manipulating the simulation driving part, and a simulation control instruction corresponding to the simulation driving operation may be generated by the simulation driving device at the remote control end.

In this embodiment, a corresponding relationship between a simulation control instruction generated through a simulation driving operation (e.g., turning the steering wheel and turning the pedal) performed by the assistance driving user at the remote control end and a control instruction outputted by the control system of the vehicle may be pre-established. After the simulation control instruction corresponding to the simulation driving operation is generated by the simulation driving device at the remote control end, the simulation control instruction corresponding to the simulation driving operation may be converted into a corresponding control instruction executable by the vehicle according to the pre-established corresponding relationship between the simulation control instruction and the control instruction outputted by the control system of the vehicle.

In this embodiment, the simulation driving device at the remote control end may have simulation driving part same as the control part of the vehicle. Therefore, when the assistance driving user performs the simulation driving operation using the simulation driving device, the generated simulation control instruction corresponding to the simulation driving operation is a control instruction directly executable by a corresponding control part of the vehicle. That is, the generated simulation control instruction corresponding to the simulation driving operation may be directly used as the assistance control instruction.

In this embodiment, after being generated by the simulation driving device at the remote control end, the assistance control instruction may be sent to the server at the remote control end by the simulation driving device at the remote control end. Then, the assistance control instruction is sent to the vehicle by the server at the remote control end. Therefore, after receiving the assistance control instruction, the vehicle may execute the assistance control instruction, thus implementing the assistance driving for the vehicle.

In this embodiment, the travelling environment information may be presented to the assistance driving user at the remote control end on the simulation driving device at the remote control end, so that the assistance driving user at the remote control end may learn the environment where the vehicle is currently located. Based on the learned environment where the vehicle is currently located, the assistance driving user at the remote control end may perform a simulation driving operation (e.g., turning the steering wheel and turning the pedal) by manipulating the simulation driving part, to generate the assistance control instruction. The assistance control instruction is sent to the vehicle, and the vehicle executes the assistance control instruction. Therefore, the assistance driving user at the remote control end may be equivalent to that currently the assistance driving user at the remote control end is located in the vehicle and drives the vehicle.

In some alternative implementations of this embodiment, the assistance driving instruction may be generated based on detecting, by the vehicle, that the vehicle is in a complex travelling environment. When being in a complex travelling environment, the vehicle may detect that the vehicle is in the complex travelling environment according to the travelling environment information of the vehicle, and may generate the assistance driving instruction, and send the assistance driving instruction to the server at the remote control end. Then, the server at the remote control end sends the assistance driving instruction sent from the vehicle to the simulation driving device at the remote control end. After receiving the assistance driving instruction associated with the vehicle, the simulation driving device at the remote control end may set the simulation driving part, such as the steering wheel and the pedal, to a working state.

In some alternative implementations of this embodiment, the assistance driving instruction associated with the vehicle may be generated based on an instructing operation for assistance driving performed by the driver of the vehicle in a situation such as a parking situation and a fatigue situation.

When the driver of a vehicle drives the vehicle to a place where parking through the assistance driving is needed, the instructing operation for assistance driving performed by the driver of the vehicle may refer to an operation of clicking the button for requesting the assistance driving on an interface of a terminal application, the terminal application is for an interaction between the terminal and with an autonomous driving vehicle, to request the assistance driving user to perform a simulation driving operation, to control the vehicle to travel to a parking place and park. After the driver of the vehicle clicks the button, the assistance driving instruction is generated. The assistance driving instruction is sent by the vehicle to the server at the remote control end, and then the assistance driving instruction sent from the vehicle is sent by the server at the remote control end to the simulation driving device at the remote control end. After receiving the assistance driving instruction associated with the vehicle, the simulation driving device at the remote control end may set the simulation driving part, such as the steering wheel and the pedal, to the working state.

When the driver of the vehicle is tired and needs the assistance driving, the instructing operation for assistance driving performed by the driver of the vehicle may refer to an operation of clicking the button for requesting the assistance driving on an interface of a terminal application, the terminal application is for an interaction between the terminal and with an autonomous driving vehicle, to request the assistance driving user to perform a simulation driving operation to control the vehicle to continue travelling. After the driver of the vehicle clicks the button, the assistance driving instruction is generated. The assistance driving instruction is sent by the vehicle to the server at the remote control end, and then the assistance driving instruction sent from the vehicle is sent by the server at the remote control end to the simulation driving device at the remote control end. After receiving the assistance driving instruction associated with the vehicle, the simulation driving device at the remote control end may set the simulation driving part, such as the steering wheel and the pedal, to the working state.

In some alternative implementations of this embodiment, the assistance driving instruction may be generated based on a vehicle traveling to a risky area, at least a part of road objects in the risky area being not annotated in a high-precision map. The high-precision map contains road objects such as a lane line, a zebra line, a stop line, a diversion line and a traffic sign, and annotation data of the road objects. The annotation data of the lane line, the zebra line, the stop line and the diversion line includes: a parameter equation, and coordinates of a corner point in the world coordinate system. When at least a part of the road objects in an area are not annotated in the high-precision map, that is, at least a part of the road objects do not have annotation data in the high-precision map, the area may be referred to as a risky area.

For example, the vehicle travels within a territory according to the high-precision map. Road objects in some areas within the territory are pre-annotated in the high-precision map of the territory, and the annotated road objects all have annotation data. When the vehicle travels to an area, where a plurality of road objects in the area are detected by performing image recognition on a collected road condition image and it is determined that there is no annotation data for the plurality of detected road objects in the high-precision map, then it may be determined that a plurality of detected road objects are not annotated in the high-precision map and the vehicle travels to a risky area. At this time, the vehicle generates an assistance driving instruction, and the assistance driving instruction is sent by the vehicle to the server at the remote control end. Then, the assistance driving instruction sent from the vehicle is sent by the server at the remote control end to the simulation driving device at the remote control end. After receiving the assistance driving instruction associated with the vehicle, the simulation driving device at the remote control end may set the simulation driving part, such as the steering wheel and the pedal, to the working state.

In some alternative implementations of this embodiment, the vehicle may detect whether a situation needed to be perceived (e.g., a situation where the vehicle vibrates or skids) occurs during travelling. When detecting that the situation needed to be perceived (e.g., the situation where the vehicle vibrates or skids) occurs during the travelling, the vehicle may send an identifier of the situation needed to be perceived and occurred to the vehicle to the server at the remote control end, and the server at the remote control end sends the identifier to the simulation driving device. The simulation driving device may determine a simulation perception operation associated with the situation needed to be perceived and occurred to the vehicle, the simulation perception operation being used to cause the assistance driving user to perceive the situation needed to be perceived and occurred to the vehicle. Then, the simulation perception operation is performed, so that the assistance driving user perceives the situation needed to be perceived and occurred to the vehicle. For example, when a vibration situation occurs to the vehicle, the determined simulation perception operation includes: controlling the seat of the assistance driving user in the simulation driving device to simulate the vibration situation. The simulation perception operation is performed, such that the assistance driving user perceives the vibration situation occurred to the vehicle.

Figure 3:
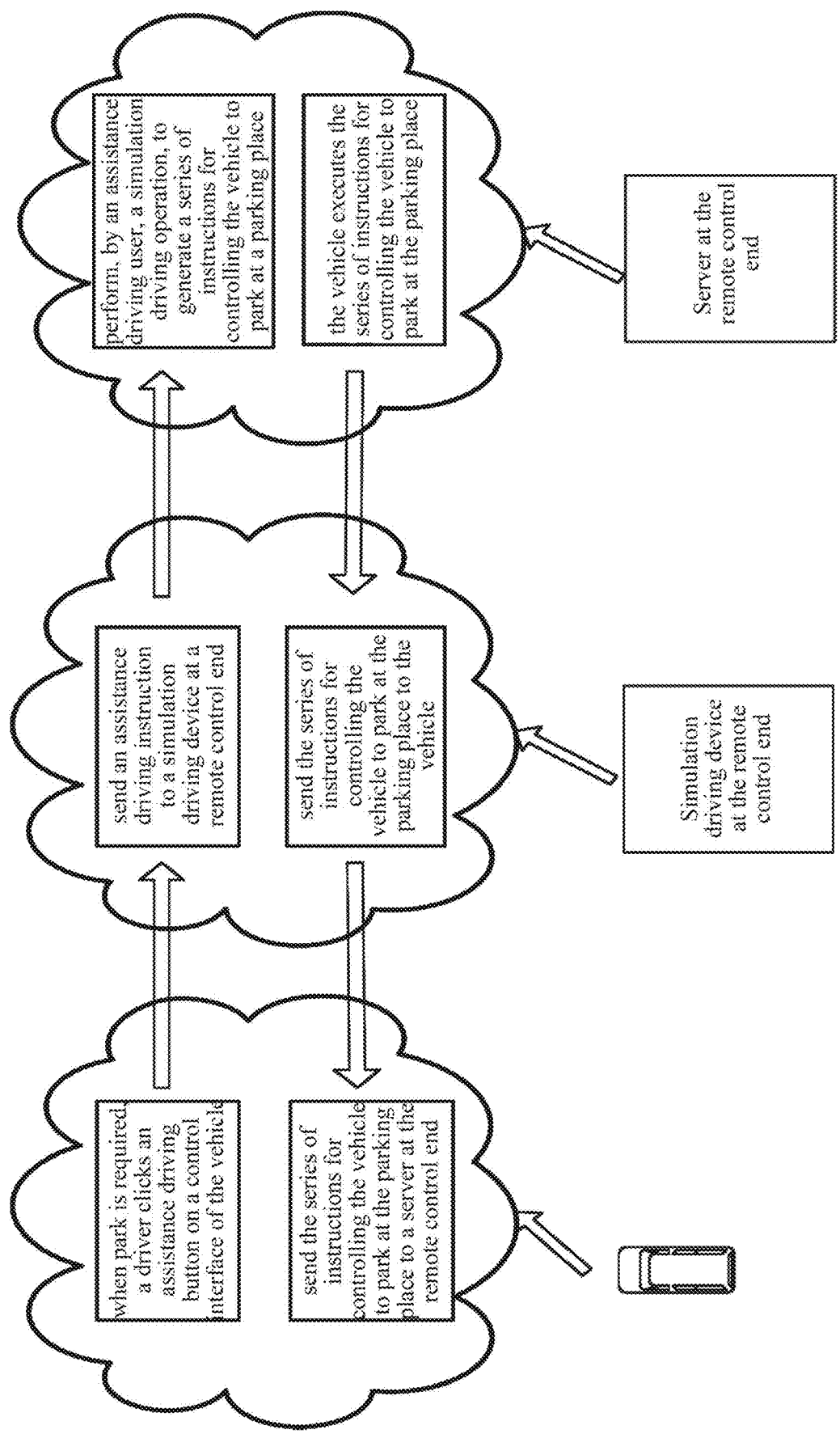
FIG. 3 is an example flowchart of the method for controlling a vehicle according to an embodiment of the present disclosure.

Referring to FIG. 3, FIG. 3 is an example flowchart of the method for controlling a vehicle according to an embodiment of the present disclosure.

When a driver of a vehicle drives the vehicle to a place where parking through assistance riving is needed, the instructing operation for assistance driving performed by the driver of the vehicle may refer to an operation of clicking the button for requesting the assistance driving on an interface of a terminal application, the terminal application is for an interaction between the terminal and with an autonomous driving vehicle, to request the assistance driving user to perform a simulation driving operation, to control the vehicle to travel to a parking place and park. After the driver of the vehicle clicks the button, the assistance driving instruction is generated. The assistance driving instruction is sent by the vehicle to the server at the remote control end, and then the assistance driving instruction sent from the vehicle is sent by the server at the remote control end to the simulation driving device at the remote control end. After receiving the assistance driving instruction associated with the vehicle, the simulation driving device at the remote control end may set the simulation driving part, such as the steering wheel and the pedal, to the working state. The assistance driving user at the remote control end may perform a series of simulation driving operations associated with controlling the vehicle to travel to the parking place and park, by manipulating the simulation driving part in the simulation driving device.

Correspondingly, a series of assistance control instructions for controlling the vehicle to travel to the parking place and park are generated in the simulation driving device. The series of assistance control instructions for controlling the vehicle to travel to the parking place and park may be sent by the simulation driving device at the remote control end to the server at the remote control end. The series of assistance control instructions for controlling the vehicle to travel to the parking place and park is sent by the server at the remote control end to the vehicle. After receiving the series of assistance control instructions, the vehicle executes the series of assistance control instructions, such that the vehicle travels to the parking place and parks, thus implementing the assistance driving of the vehicle.

Figure 4:
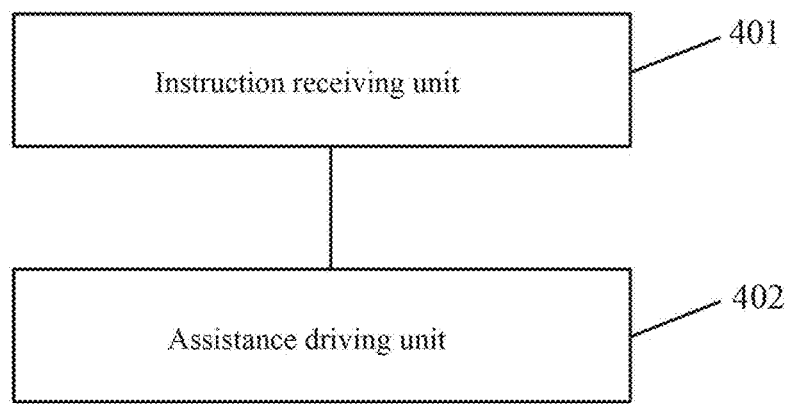
FIG. 4 is a schematic structural diagram of an apparatus for controlling a vehicle according to an embodiment of the present disclosure.

Referring to FIG. 4, as an implementation of the method shown in the above drawings, an embodiment of the present disclosure provides an apparatus for controlling a vehicle. The embodiment of the apparatus corresponds to the embodiment of the method shown in FIG. 2.

As shown in FIG. 4, the apparatus for controlling a vehicle in this embodiment includes an instruction receiving unit 401 and an assistance driving unit 402. Here, the instruction receiving unit 401 is configured to receive an assistance driving instruction associated with a vehicle. The assistance driving unit 402 is configured to send an assistance control instruction to the vehicle, to cause the vehicle to execute the assistance control instruction to control the vehicle, the assistance control instruction being generated through a simulation driving operation performed by an assistance driving user based on travelling environment information of the vehicle presented to the assistance driving user.

In some alternative implementations of this embodiment, the received assistance driving instruction associated with the vehicle comprises one of: an assistance driving instruction sent by the vehicle, and an assistance driving instruction inputted by the assistance driving user.

In some alternative implementations of this embodiment, the apparatus for controlling a vehicle in this embodiment further includes a perception simulation unit. The perception simulation unit is configured to determine a simulation perception operation associated with a situation occurred to the vehicle and needed to be perceived, the simulation perception operation being used to cause the assistance driving user to perceive the situation occurred to the vehicle and needed to be perceived; and perform the simulation perception operation.

In some alternative implementations of this embodiment, the received assistance driving instruction associated with the vehicle is the assistance driving instruction sent by the vehicle, and the assistance driving instruction sent by the vehicle is generated based on a driver of the vehicle performing an instructing operation for assistance driving in a situation where assistance driving is needed.

In some alternative implementations of this embodiment, the situation where the assistance driving is needed comprises one of: a parking situation, and a driver fatigue situation.

In some alternative implementations of this embodiment, the received assistance driving instruction associated with the vehicle is the assistance driving instruction sent by the vehicle, and the assistance driving instruction sent by the vehicle is generated based on the vehicle detecting that the vehicle is in a complex travelling environment.

In some alternative implementations of this embodiment, the received assistance driving instruction associated with the vehicle is the assistance driving instruction sent by the vehicle, and the assistance driving instruction sent by the vehicle is generated based on the vehicle travelling to a risky area, at least a part of road objects in the risky area being not annotated in a high-precision map.

According to the method and apparatus for controlling a vehicle provided in embodiments of the present disclosure, the assistance driving instruction associated with the vehicle is received; and the assistance control instruction is sent to the vehicle, to cause the vehicle to execute the assistance control instruction to control the vehicle, the assistance control instruction being generated through the simulation driving operation performed by the assistance driving user based on the travelling environment information of the vehicle presented to the assistance driving user. It is implemented that the assistance control instruction is generated by performing, by the assistance driving user at the remote control end, the simulation driving operation based on the travelling environment information indicating the environment where the vehicle is located, to assist the vehicle in driving, thus enhancing the convenience of the driving of the vehicle and improving the safety of the driving of the vehicle.

Some embodiments of the present disclosure further provide an electronic device, and the electronic device may be configured with one or more processors and a storage configured to store one or more programs. The one or more programs may contain instructions used to perform the operations described in the above embodiments. The one or more programs, when executed by the one or more processors, cause the one or more processors to execute the instructions of the operations described in the above embodiments.

Some embodiments of the present disclosure further provide a computer readable medium. The computer readable medium may be a computer readable medium included in the electronic device, or a stand-alone computer readable medium not assembled into the electronic device. The above computer readable medium carries one or more programs. The one or more programs, when executed by the electronic device, cause the electronic device to execute the instructions of the operations described in the above embodiments.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in embodiments of the present disclosure are examples.

What is claimed is:

1. A method for controlling a vehicle, comprising:
receiving, by a simulation driving device at a remote control end, an assistance driving instruction associated with a vehicle, wherein the received assistance driving instruction associated with the vehicle is the assistance driving instruction sent by the vehicle, and the assistance driving instruction sent by the vehicle is generated based on a driver of the vehicle performing an instructing operation for assistance driving in a situation where assistance driving is needed, and the situation where the assistance driving is needed comprises one of: a parking situation, or a driver fatigue situation;
setting a simulation driving component of the simulation driving device to a working state;
performing a simulation driving operation by manipulating the simulation driving component;
generating an assistance control instruction corresponding to the simulation driving operation;
sending the assistance control instruction to the vehicle;
pre-establishing a corresponding relationship between the assistance control instruction and a control instruction outputted by a control system of the vehicle; and
converting the assistance control instruction to the control instruction executable by the vehicle according to the pre—established corresponding relationship, to cause the vehicle to execute the control instruction to control the vehicle, the assistance control instruction being generated through the simulation driving operation performed by an assistance driving user based on travelling environment information of the vehicle presented to the assistance driving user.

2. The method according to claim 1, wherein the received assistance driving instruction associated with the vehicle comprises one of: an assistance driving instruction sent by the vehicle, or an assistance driving instruction inputted by the assistance driving user.

3. The method according to claim 2, further comprising:
determining a simulation perception operation associated with a situation occurred to the vehicle and needed to be perceived, the simulation perception operation being used to cause the assistance driving user to perceive the situation occurred to the vehicle and needed to be perceived; and
performing the simulation perception operation.

4. The method according to claim 3, wherein the received assistance driving instruction associated with the vehicle is the assistance driving instruction sent by the vehicle, and the assistance driving instruction sent by the vehicle is generated based on the vehicle detecting that the vehicle is in a complex travelling environment.

5. The method according to claim 3, wherein the received assistance driving instruction associated with the vehicle is the assistance driving instruction sent by the vehicle, and the assistance driving instruction sent by the vehicle is generated based on the vehicle travelling to a risky area, at least a part of road objects in the risky area being got annotated in a high-precision map.

6. An electronic device, comprising:
one or more processors; and
a storage, configured to store one or more programs, wherein the one or more programs, when executed by the one or more processors, cause the one or more processors to implement operations, the operations comprising:
- receiving, by a simulation driving device at a remote control end, an assistance driving instruction associated with a vehicle, wherein the received assistance driving instruction associated with the vehicle is the assistance driving instruction sent by the vehicle, and the assistance driving instruction sent by the vehicle is generated based on a driver of the vehicle performing an instructing operation for assistance driving in a situation where assistance driving is needed, and the situation where the assistance driving is needed comprises one of: a parking situation, or a driver fatigue situation;
- setting a simulation driving component of the simulation driving device to a working state;
- performing a simulation driving operation by manipulating the simulation driving component;
- generating an assistance control instruction corresponding to the simulation driving operation;
- sending the assistance control instruction to the vehicle;
- pre-establishing a corresponding relationship between the assistance control instruction and a control instruction outputted by a control system of the vehicle; and
- converting the assistance control instruction to the control instruction executable by the vehicle according to the pre-established corresponding relationship, to cause the vehicle to execute the assistance control instruction to control the vehicle, the assistance control instruction being generated through the simulation driving operation performed by an assistance driving user based on travelling environment information of the vehicle presented to the assistance driving user.

7. The device according to claim 6, wherein the received assistance driving instruction associated with the vehicle comprises one of: an assistance driving instruction sent by the vehicle, or an assistance driving instruction inputted by the assistance driving user.

8. The device according to claim 7, wherein the operations further comprise:
- determining a simulation perception operation associated with a situation occurred to the vehicle and needed to be perceived, the simulation perception operation being used to cause the assistance driving user to perceive the situation occurred to the vehicle and needed to be perceived; and
- performing the simulation perception operation.

9. The device according to claim 8, wherein the received assistance driving instruction associated with the vehicle is the assistance driving instruction sent by the vehicle, and the assistance driving instruction sent by the vehicle is generated based on the vehicle detecting that the vehicle is in a complex travelling environment.

10. The device according to claim 8, wherein the received assistance driving instruction associated with the vehicle is the assistance driving instruction sent by the vehicle, and the assistance driving instruction sent by the vehicle is generated based on the vehicle travelling to a risky area, at least a part of road objects in the risky area being not annotated in a high-precision map.

11. A non-transitory computer readable storage medium, storing a computer program, wherein the program, when executed by a processor, causes the processor to perform operations, the operations comprising:
- receiving, by a simulation driving device at a remote control end, an assistance driving instruction associated with a vehicle, wherein the received assistance driving instruction associated with the vehicle is the assistance driving instruction sent by the vehicle, and the assistance driving instruction sent by the vehicle is generated based on a driver of the vehicle performing an instructing operation for assistance driving in a situation where assistance driving is needed, and the situation where the assistance driving is needed comprises one of: a parking situation, or a driver fatigue situation;
- setting a simulation driving component of the simulation driving device to a working state;
- performing a simulation driving operation by manipulating the simulation driving component;
- generating an assistance control instruction corresponding to the simulation driving operation;
- sending the assistance control instruction to the vehicle;
- pre-establishing a corresponding relationship between the assistance control instruction and a control instruction outputted by a control system of the vehicle; and
- converting the assistance control instruction to the control instruction executable by the vehicle according to the pre-established corresponding relationship, to cause the vehicle to execute the assistance control instruction to control the vehicle, the assistance control instruction being generated through the simulation driving operation performed by an assistance driving user based on travelling environment information of the vehicle presented to the assistance driving user.

12. The medium according to claim 11, wherein the received assistance driving instruction associated with the vehicle comprises one of: an assistance driving instruction sent by the vehicle, or an assistance driving instruction inputted by the assistance driving user.

13. The medium according to claim 12, wherein the operations further comprise:
- determining a simulation perception operation associated with a situation occurred to the vehicle and needed to be perceived, the simulation perception operation being used to cause the assistance driving user to perceive the situation occurred to the vehicle and needed to be perceived; and
- performing the simulation perception operation.

14. The medium according to claim 13, wherein the received assistance driving instruction associated with the vehicle is the assistance driving instruction sent by the vehicle, and the assistance driving instruction sent by the vehicle is generated based on the vehicle detecting that the vehicle is in a complex travelling environment.

* * * * *

UNITED STATES PATENT AND TRADEMARK OFFICE
CERTIFICATE OF CORRECTION

| | |
|---|---|
| PATENT NO. | : 11,599,122 B2 |
| APPLICATION NO. | : 17/116973 |
| DATED | : March 7, 2023 |
| INVENTOR(S) | : Jinyang Gu |

It is certified that error appears in the above-identified patent and that said Letters Patent is hereby corrected as shown below:

On the Title Page

Item (73), Lines 1-2, under Assignee, delete "Beijing Baidu Netcom Science and Technology Co., Ltd., Beijing (CN)" and insert --Apollo Intelligent Driving Technology (Beijing) Co., Ltd.--.

Signed and Sealed this
Sixth Day of June, 2023

Katherine Kelly Vidal
*Director of the United States Patent and Trademark Office*